Feb. 9, 1937.  H. E. WANER  2,069,907
APPARATUS FOR INSTALLING TUBULAR RIVETS
Filed July 11, 1935
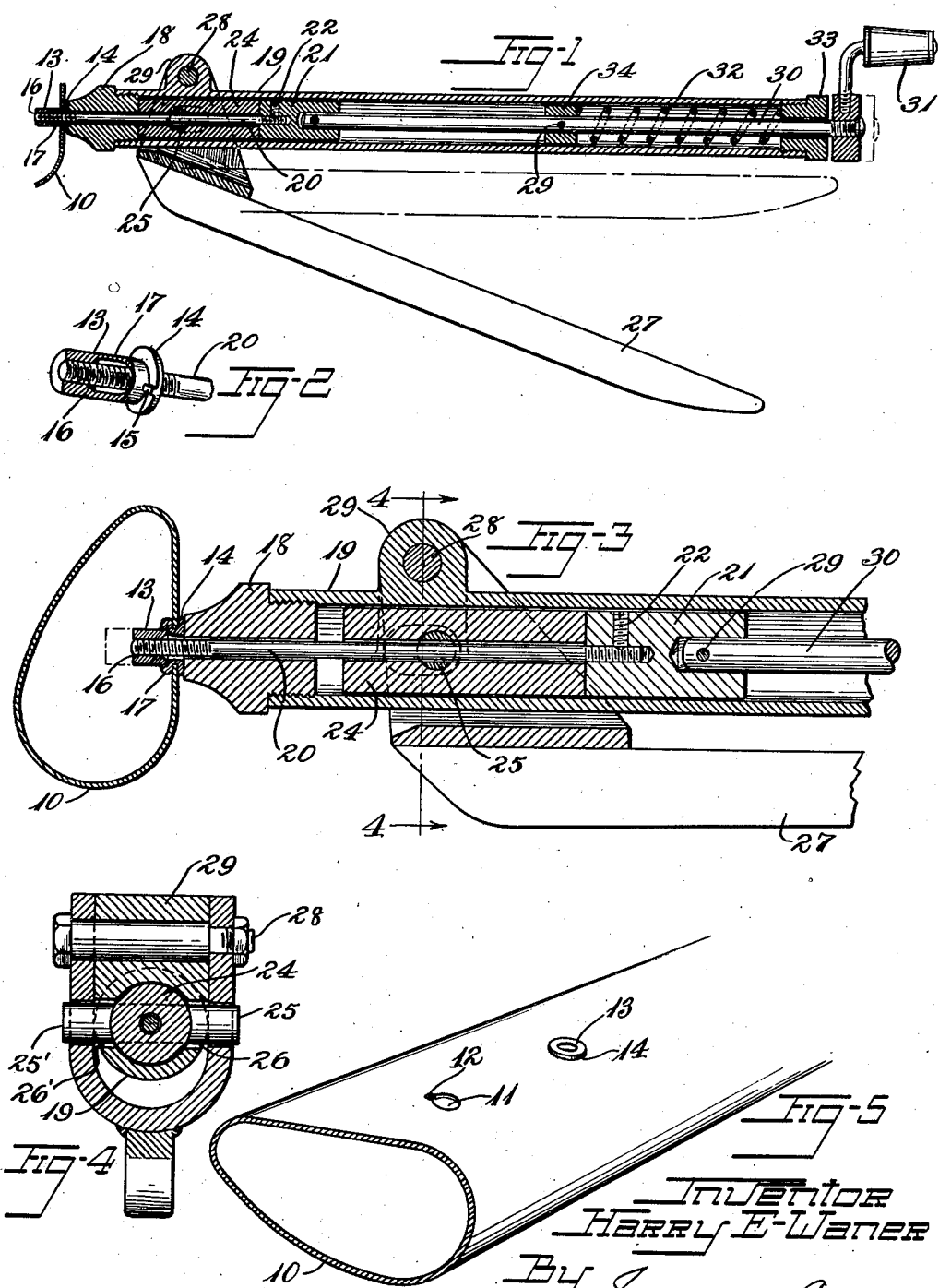
Inventor
Harry E. Waner
By Eakin & Amy
Attys.

Patented Feb. 9, 1937

2,069,907

UNITED STATES PATENT OFFICE 2,069,907

APPARATUS FOR INSTALLING TUBULAR RIVETS

Harry E. Waner, Akron, Ohio, assignor to The B. F. Goodrich Company, New York, N. Y., a corporation of New York Application July 11, 1935, Serial No. 30,889

8 Claims. (Cl. 218—19)

This invention relates to tubular rivets and to methods and apparatus for installing the same.

The problem of fastening articles to walls of thin sheet metal, especially where one side only of the sheet is available for operation, presents many difficulties. The thinness of the metal sheet precludes the use of threaded screws except for exceptionally light loads, and the threading of the holes requires considerable expenditure of time. On the other hand, ordinary rivets can not be applied in the absence of any means for bucking the rivets from the opposite side of the sheet. With thin metals welding becomes impractical and with certain metals such as aluminum soldering is practically impossible.

The present invention aims to provide a tubular fastening element which may be applied from one side only of the sheet, and a special device for making the installation of the fastening element possible.

The principal objects of the invention are to provide economy and simplicity of procedure in the application of fastening devices, and to provide a novel fastening element to facilitate such procedure.

Other objects will appear from the following description and the accompanying drawing.

Of the drawing:

Fig. 1 is a sectional view in elevation showing the apparatus in its preferred form in use in the installation of one of the tubular rivets, the apparatus being shown in the position of initially inserting the rivet in an aperture in a sheet metal wall, dot and dash lines indicating the position of the handles after the rivet has been fully installed.

Fig. 2 is a perspective view of a preferred form of the tubular rivet of my invention.

Fig. 3 is a sectional view similar to Fig. 1, with parts broken away, showing the second step in the procedure of installing the rivet.

Fig. 4 is a section taken on line 4—4 of Fig. 3.

Fig. 5 is a perspective view of a hollow article having a thin wall prepared to receive one of the rivets and with one of the rivets in place.

Referring to the drawing the numeral 10 designates a thin wall of metal or other rigid material forming a part of a hollow article accessible only from one side, to which it is desired to fasten other parts. The numeral 11 designates an aperture therein comprising a circular opening having a key way 12 as an extension thereof. Such apertures may be formed in any desired manner to receive the tubular rivets of this invention.

The rivet 13 comprises a tubular body having a flange 14 at one end and preferably formed with an integral key 15 for engaging the key way 12 to prevent rotation of the rivet when it is in place. The opposite extremity of the rivet is threaded internally as at 16 to provide anchorage for a screw. The wall of the rivet between the threaded portion 16 and the flange 14 is counterbored to reduce the wall thickness and provide a collapsible portion 17.

The tubular stem of the rivet is inserted through the aperture 11 with the flange against the outer surface of the wall. The rivet may then be shortened by endwise pressure so as to collapse the portion 17 as seen in Fig. 3, thereby forming a flange on each side of the metal wall 10.

In order to accomplish such collapse of the rivet wall by operation from one side only of the wall, the apparatus employed is as follows:

A setting anvil 18, comprising a centrally bored flat ended plug, is mounted in one end of a hollow tubular barrel 19. A draw rod 20 extending through the plug 18 is threaded at one end to engage the threads in the rivet 13. Its opposite end is fixed to a draw head 21, as by being threaded therein and locked against rotation by a screw 22. Draw head 21 is loosely enclosed by the barrel 19. A tubular cross head 24, slidably mounted in the barrel between the anvil 18 and the draw head 21, is provided with trunnions 25, 25' which extend loosely through elongate slots 26, 26' formed in the barrel. A lever 27 hinged by a pin 28 to an ear 29, formed on the side of the barrel is adapted to impart a longitudinal movement to the draw rod 20, toward the anvil 18, when the lever 27 is forced toward the barrel. If the draw rod is engaged in the threads of a tubular rivet and the flanged head of the rivet is against the anvil, as shown in Fig. 1, and such movement of the lever is attempted, the portion 17 of the rivet will be collapsed as shown in Fig. 3.

In order conveniently to release the tool from the collapsed rivet, draw head 21 is attached, as by a cross pin 29, to a shaft 30, extending lengthwise through the barrel 19 and secured to a crank 31 whereby the draw rod 20 may be screwed out of the rivet.

A coil spring 32, of the compression type, extending between a plug 33, through which the shaft 30 is journaled at the handle end of the barrel 19, and a collar 34, fixed to shaft 30 within barrel 19, normally holds the draw rod in its advanced position.

When the rivet is to be inserted in a wall of metal or other thin material, the rivet is screwed onto the advanced end of the draw rod until its flanged head meets the anvil. The rivet is then inserted in the aperture 11 in the wall and while it is held with its flange thereagainst, lever 27 is operated to collapse the rivet. The crank 31 is then turned to withdraw the draw rod.

The invention is especially useful where stay rods, de-icer equipment, or other parts are to be fastened to the thin metal skin of aircraft. The rivets may be made of any soft metal such as aluminum or copper or their alloys.

I claim:

1. Apparatus for installing internally threaded tubular rivets, said apparatus comprising an anvil for holding the rivet in place, a draw rod extending through the anvil and adapted to engage in the threaded portion of the rivet, and means for effecting a longitudinal movement of the draw rod with respect to the anvil to collapse the rivet.

2. Apparatus for installing internally threaded tubular rivets, said apparatus comprising an anvil for holding the rivet in place, a draw rod extending through the anvil and adapted to engage in the threaded portion of the rivet, means for effecting a longitudinal movement of the draw rod with respect to the anvil to collapse the rivet, and means for releasing the draw rod from the rivet.

3. Apparatus for installing internally threaded tubular rivets, said apparatus comprising an anvil for holding the rivet in place, a threaded draw rod extending through the anvil and adapted to engage the threads in the rivet, means for effecting a longitudinal movement of the draw rod to collapse the rivet, and means for rotating the draw rod to release the rivet.

4. Apparatus for installing internally threaded tubular rivets, said apparatus comprising an anvil for holding the rivet in place, a threaded draw rod extending through the anvil and adapted to engage the threads in the rivet, means for effecting a longitudinal movement of the draw rod to collapse the rivet, means for resiliently urging the draw rod to its advanced position through the anvil, and means for rotating the draw rod to release the rivet.

5. Apparatus for installing an internally threaded tubular rivet, said apparatus comprising a tubular housing having an anvil at one end, a draw rod in the housing and extending through the anvil and adapted to engage the threaded portion of the rivet, and means associated with said housing and rod for effecting a longitudinal movement of the rod with respect to the anvil to collapse the rivet.

6. Apparatus for installing an internally threaded tubular rivet, said apparatus comprising a tubular housing having an anvil at one end, a draw rod in the housing and extending through the anvil and adapted to engage the threaded portion of the rivet, and means associated with said housing and rod for effecting a longitudinal movement of the rod with respect to the anvil to collapse the rivet, the rod moving means comprising a lever pivoted to the housing and having a connection with the draw rod.

7. Apparatus for installing an internally threaded tubular rivet, said apparatus comprising a tubular housing having an anvil at one end, a draw rod in the housing and extending through the anvil and adapted to engage the threaded portion of the rivet, resilient means in said housing urging the rod to its advanced position through the anvil, and means associated with said housing and rod for effecting a longitudinal movement of the rod with respect to the anvil to collapse the rivet.

8. Apparatus for installing an internally threaded tubular rivet, said apparatus comprising a tubular housing having an anvil at one end, a draw rod in the housing and extending through the anvil and adapted to engage the threaded portion of the rivet, resilient means in said housing urging the rod to its advanced position through the anvil, means associated with said housing and rod for effecting a longitudinal movement of the rod with respect to the anvil to collapse the rivet and means for rotating the rod with relation to the rivet.

HARRY E. WANER.